(12) United States Patent
Gorman et al.

(10) Patent No.: US 11,036,503 B2
(45) Date of Patent: Jun. 15, 2021

(54) PREDICATE INDICATOR GENERATION FOR VECTOR PROCESSING OPERATIONS

(71) Applicant: ARM LIMITED, Cambridge (GB)

(72) Inventors: Gary Alan Gorman, Austin, TX (US); Lee Evan Eisen, Round Rock, TX (US); Neil Burgess, Cardiff (GB); Daniel Arulraj, Austin, TX (US)

(73) Assignee: ARM LIMITED, Cambridge (GB)

( * ) Notice: Subject to any disclaimer, the term of this patent is extended or adjusted under 35 U.S.C. 154(b) by 204 days.

(21) Appl. No.: 15/236,769

(22) Filed: Aug. 15, 2016

(65) Prior Publication Data

US 2018/0046460 A1    Feb. 15, 2018

(51) Int. Cl.
*G06F 9/30*    (2018.01)

(52) U.S. Cl.
CPC ........ *G06F 9/30036* (2013.01); *G06F 9/3013* (2013.01); *G06F 9/30018* (2013.01); *G06F 9/30072* (2013.01)

(58) Field of Classification Search
CPC .................................................. G06F 9/30036
See application file for complete search history.

(56) References Cited

U.S. PATENT DOCUMENTS

| | | | | |
|---|---|---|---|---|
| 7,991,820 B1* | 8/2011 | Sohay | .............. | G06F 7/505 708/671 |
| 2006/0004996 A1* | 1/2006 | Gonion | .............. | G06F 8/441 712/241 |
| 2008/0052456 A1* | 2/2008 | Ash | .............. | G06F 12/0804 711/113 |
| 2010/0325399 A1* | 12/2010 | Gonion | .............. | G06F 8/4441 712/222 |
| 2010/0329267 A1* | 12/2010 | Sakamoto | .............. | H04L 12/42 370/400 |
| 2011/0078415 A1 | 3/2011 | Johnson | | |
| 2014/0289495 A1* | 9/2014 | Gonion | .............. | G06F 9/30036 712/7 |
| 2014/0289496 A1* | 9/2014 | Gonion | .............. | G06F 9/30036 712/9 |
| 2015/0339158 A1* | 11/2015 | Harris | .............. | G06F 9/4881 718/103 |
| 2016/0092218 A1* | 3/2016 | Gonion | .............. | G06F 9/30036 712/7 |

(Continued)

OTHER PUBLICATIONS

U.S. Appl. No. 15/236,728, filed Aug. 15, 2016, Inventor: Burgess et al.

(Continued)

*Primary Examiner* — Eric Coleman
(74) *Attorney, Agent, or Firm* — Nixon & Vanderhye, P.C.

(57) ABSTRACT

Processing circuitry selectively applies vector processing operations to one or more data items of one or more data vectors. Each data vector comprises a plurality of data items at respective vector positions in the data vector according to the state of respective predicate indicators associated with the vector positions. Predicate generation circuitry apply a processing operation to generate a set of predicate indicators, each associated with a respective one of the vector positions, to generate a count value indicative of the number of predicate indicators in the set having a given state, and to store the generated set of predicate indicators and the count value in a predicate store.

9 Claims, 6 Drawing Sheets

(56) References Cited

U.S. PATENT DOCUMENTS

2016/0342417 A1    11/2016  Uliel

OTHER PUBLICATIONS

Final Office Action dated Jun. 14, 2019 in U.S. Appl. No. 15/236,728, 20 pages.
Advisory Action dated Oct. 21, 2019 in U.S. Appl. No. 15/236,728, 3 pages.
Final Office Action dated Oct. 7, 2020, issued in Burgess, et al., U.S. Appl. No. 15/236,728, filed Aug. 15, 2016 (19 pages).
Office Action dated May 29, 2020, issued in Burgess, et al., U.S. Appl. No. 15/236,728, filed Aug. 15, 2016 (17 pages).

* cited by examiner

PREDICATE INDICATOR GENERATION FOR VECTOR PROCESSING OPERATIONS

BACKGROUND

The present disclosure relates to data processing apparatus and methods.

Some data processing arrangements allow for vector processing operations, involving applying a single vector processing instruction to data items of a data vector having a plurality of data items at respective positions in the data vector. By contrast, scalar processing operates on, effectively, single data items rather than on data vectors.

Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

In some systems, vector processing operations are (at least in part) under the control of so-called predicate indicators, so that processing circuitry is used to selectively apply vector processing operations to one or more data items of one or more data vectors each comprising a plurality of data items at respective vector positions in the data vector, according to the state of respective predicate indicators associated with the vector positions.

SUMMARY

In one example configuration, there is provided a data processing apparatus comprising:

processing circuitry to selectively apply vector processing operations to one or more data items of one or more data vectors each comprising a plurality of data items at respective vector positions in the data vector, according to the state of respective predicate indicators associated with the vector positions;

a predicate store; and predicate generation circuitry to apply a processing operation to generate a set of predicate indicators, each associated with a respective one of the vector positions, to generate a count value indicative of the number of predicate indicators in the set having a given state, and to store the generated set of predicate indicators and the count value in the predicate store.

In another example configuration, there is provided a data processing method comprising:

selectively applying vector processing operations to one or more data items of one or more data vectors each comprising a plurality of data items at respective vector positions in the data vector, according to the state of respective predicate indicators associated with the vector positions;

applying a processing operation to generate a set of predicate indicators, each associated with a respective one of the vector positions;

generating a count value indicative of the number of predicate indicators in the set having a given state, and storing the generated set of predicate indicators and the count value in a predicate store.

In another example configuration, there is provided a data processing apparatus comprising:

means for selectively applying vector processing operations to one or more data items of one or more data vectors each comprising a plurality of data items at respective vector positions in the data vector, according to the state of respective predicate indicators associated with the vector positions;

means for storing predicate indicators;

means for generating a set of predicate indicators, each associated with a respective one of the vector positions;

means for generating a count value indicative of the number of predicate indicators in the set having a given state; and means for storing the generated set of predicate indicators and the count value in the predicate store.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

In one example embodiment, there is provided a data processing apparatus comprising:

processing circuitry to selectively apply vector processing operations to one or more data items of one or more data vectors each comprising a plurality of data items at respective vector positions in the data vector, according to the state of respective predicate indicators associated with the vector positions;

a predicate store; and predicate generation circuitry to apply a processing operation to generate a set of predicate indicators, each associated with a respective one of the vector positions, to generate a count value indicative of the number of predicate indicators in the set having a given state, and to store the generated set of predicate indicators and the count value in the predicate store.

The example configuration recognises that there can be some situations in which the execution of an instruction—which may be a so-called critical instruction for which speed of execution is important—can depend not only on the predicate indicators but also (or instead) on how many predicate indicators are set to a given state, such as a state indicating that calculation should proceed in respect of the corresponding vector position.

The example configuration provides for the advance generation and storage, in a predicate store, of a count value indicating the number of predicate indicators having the given state. This can, for example, be carried out at or in response to the generation of the set of predicate indicators.

This arrangement notes that the instructions or operations which modify or generate sets of predicate indicators are generally not performance-critical, so the derivation of the count value at that stage can be carried out without necessarily affecting system performance.

Then, when an instruction is executed which requires (as an operand, or as a value on which the execution of the instruction depends) the count value, it can simply read the count value from the predicate store. This can save time and processing at the stage of executing the performance-critical or other later instruction.

The predicate store can be such that the count values are stored in a close relationship with the corresponding sets of predicate indicators, for example in physically and/or logically adjacent storage. However, in other examples the predicate store could comprise two memory or register areas, one for the sets of predicate values and another associated memory or register area, but not necessarily physically and/or logically adjacent to that which stores the sets of predicate indicators, for the count values.

Sets of predicate indicators may be generated in various ways. One such way is to use one or more existing sets of predicate indicators as an input, and to this end, in example configurations the predicate generation circuitry is configured to generate the set of predicate indicators by applying the processing operation to one or more sets of predicate indicators retrieved from the predicate store.

A result of the generation of a set of predicate indicators can be stored in place of an input set in such a calculation. In examples, the predicate generation circuitry is configured to store a newly generated set of predicate indicators so as to overwrite one or more of the sets of predicate indicators retrieved from the predicate store.

The process to generate a count value cannot be completed earlier than the generation of the set of predicate values, and in some examples may commence in response to the completion of the generation of the set of predicate values. Therefore, in some examples, to avoid a risk of a set of predicate values being stored to the predicate store with no corresponding count value or with an invalid (for example, a previous) count value, in example arrangements the predicate generation circuitry is configured to delay storing a newly generated set of predicate indicators in the predicate store until the count value for the newly generated set of predicate indicators is ready to be stored. Another example way of addressing this issue is that the predicate generation circuitry is configured to store a count validity flag associated with each set of predicate indicators, in which the count validity flag for a given set of predicate indicators indicates whether the count value for the given set of predicate indicators is valid.

In examples, the processing circuitry is configured to apply a vector processing operation to generate an output data vector; and the predicate indicators are associated with respective vector positions in the output data vector so that vector processing operations are applied to generate data items in the output data vector at vector positions indicated by predicate indicators in the given state. The processing circuitry may comprise instruction decoder circuitry to decode program instructions; and instruction processing circuitry to execute instructions decoded by the instruction decoder circuitry.

The present techniques are particularly useful in situations in which one or more of the program instructions have the predicate indicators as an operand, execution of the one or more instructions being dependent upon the count value.

In another example embodiment, there is provided a data processing method comprising:

selectively applying vector processing operations to one or more data items of one or more data vectors each comprising a plurality of data items at respective vector positions in the data vector, according to the state of respective predicate indicators associated with the vector positions;

applying a processing operation to generate a set of predicate indicators, each associated with a respective one of the vector positions;

generating a count value indicative of the number of predicate indicators in the set having a given state, and storing the generated set of predicate indicators and the count value in a predicate store.

In another example embodiment, there is provided a data processing apparatus comprising:

means for selectively applying vector processing operations to one or more data items of one or more data vectors each comprising a plurality of data items at respective vector positions in the data vector, according to the state of respective predicate indicators associated with the vector positions;

means for storing predicate indicators;

means for generating a set of predicate indicators, each associated with a respective one of the vector positions;

means for generating a count value indicative of the number of predicate indicators in the set having a given state; and means for storing the generated set of predicate indicators and the count value in the predicate store.

Figure 1:
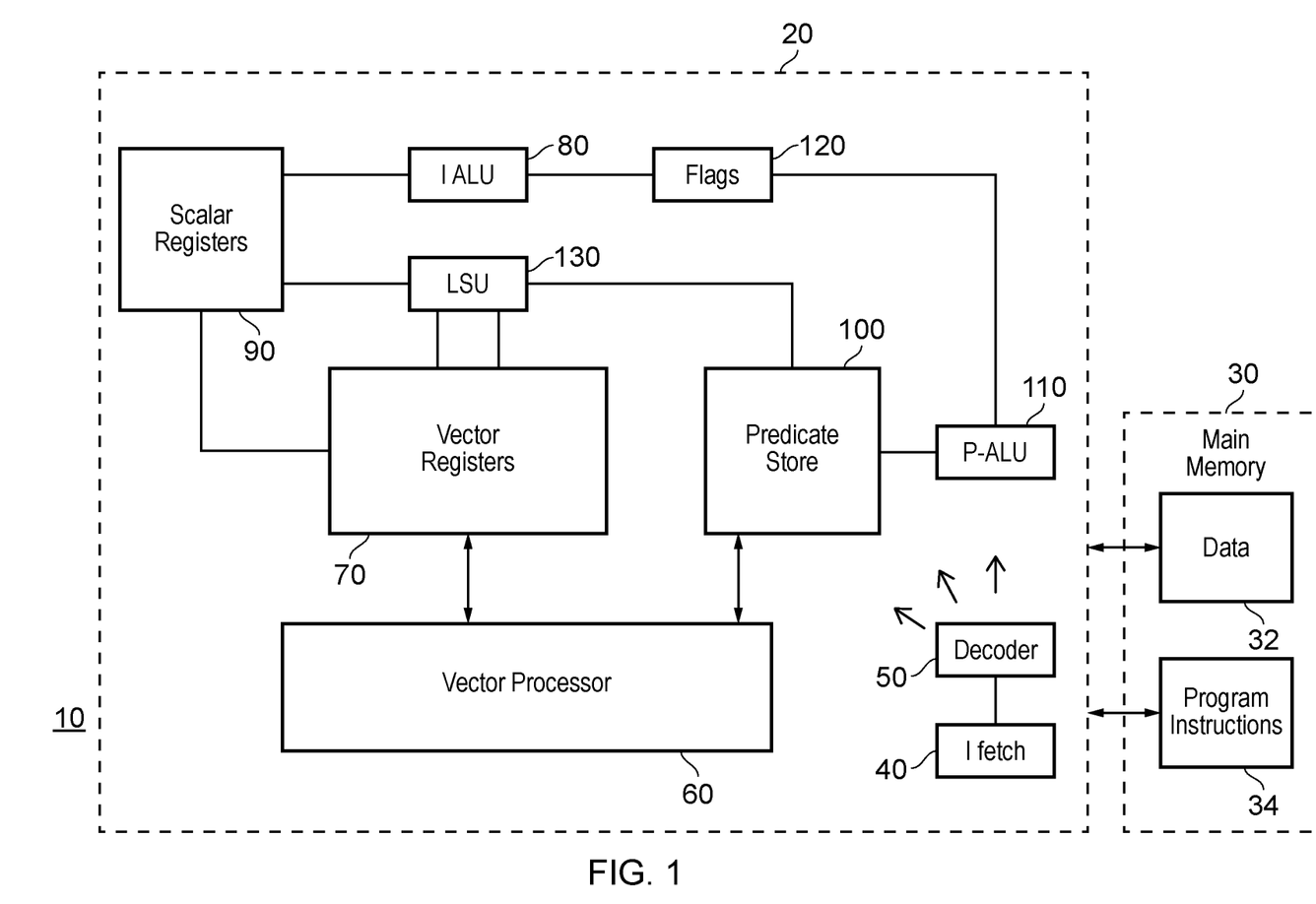
FIG. 1 schematically illustrates a data processing apparatus.

Referring now to the drawings, FIG. 1 schematically illustrates a data processing system 10 comprising a processor 20 coupled to a memory 30 storing data values 32 and program instructions 34.

The processor 20 includes an instruction fetch unit 40 for fetching program instructions 34 from the memory 30 and supplying the fetch program instructions to decoder circuitry 50. The decoder circuitry 50 decodes the fetched program instructions and generates control signals to control vector processing circuitry 60 to perform vector processing operations upon vector registers stored within vector register circuitry 70 as specified by the decoded vector instructions.

The processor 20 also comprises scalar processing circuitry such as an integer arithmetic logic unit (IALU) 80 associated with scalar registers 90.

A general distinction between scalar processing and vector processing is as follows. Vector processing involves applying a single vector processing instruction to data items of a data vector having a plurality of data items at respective positions in the data vector. Scalar processing operates on, effectively, single data items rather than on data vectors.

Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

Vector processing is carried out by the vector processor 60 in respect of (and to generate) data vectors stored in the vector registers 70. Vector operations can be carried out under the control of so-called predicate indicators held in a predicate store 100. The use of predicate indicators will be discussed in more detail below, but in brief, the vector processing circuitry can selectively apply vector processing operations to one or more data items of one or more data vectors each comprising an ordered plurality of data items at respective vector positions in the data vector, according to the state of respective predicate indicators associated with the vector positions. So, in at least some example systems, there is one predicate indicator for each possible vector position, and the state of the predicate indicator (for example, for a one-bit predicate indicator, whether the predicate indicator is a 1 or a 0) controls the way in which vector calculations are carried out at that vector position. One example is that in an arrangement in which vector processing is carried out to generate an output vector, the predicate indicators are used to determine whether or not the processing is performed in respect of each vector position in the output data vector (otherwise known as a "lane".

The sets of predicate indicators can be generated by the vector processor 60, and/or by a scalar unit referred to in FIG. 1 as a predicate arithmetic logic unit (P-ALU) 110. These (separately or collectively) provide the function of predicate generation circuitry to apply a processing operation to generate an ordered set of predicate indicators, each associated with a respective one of the vector positions can be associated with an ordered set of active indicators each having an active or an inactive state. For example, the active indicators may in fact be another set of predicate indicators used for this purpose. In some examples, a predicate indicator is taken into account if the active indicator at the same vector position is active, and is not taken into account otherwise.

Predicate indicators and active indicators could be formed as sets of multi-bit indicators, but in the present examples, one-bit indicators will be considered, having an active state (for an active indicator) and a "proceed" state indicating that the calculation in the corresponding lane should proceed (for a predicate indicator) represented by a logical 1. However, it will of course be appreciated that other representations such as other polarities or numbers of bits could be used. Where references are made to bit-wise operations with respect to predicate indicators or active indicators, this should be taken to refer to the appropriate corresponding operation in the case of multiple bit indicators.

A flag store 120 is arranged to store flags associated with the stored sets of predicate indicators. Example flags (which are stored on a set by set basis for the sets of predicate indicators) are a zero flag Z indicating (when equal to a 1) that no predicate indicators are in the proceed state in that set of predicate indicators; an N flag indicating (when equal to a 1) that the least significant predicate indicator in the ordered set for which the corresponding active indicator is "active" is in a proceed state, and a C flag indicating (when equal to a 0) that the most significant predicate indicator in the ordered set for which the corresponding active indicator is "active" is in a proceed state. The N and C flags represent examples of a status flag indicative of whether a predicate indicator at a position, in the ordered set of predicate indicators, corresponding to the position of an outermost active indicator having the active state, has a given state. In this context, "outermost" refers to either or both of most significant or least significant, with respect to the ordered set of predicate indicators. The flags are generated by the P-ALU 110 and stored in the flag store 120 in response to the generation or modification of a set of predicate indicators. The flags can be used, for example, to control conditionally executed processing functions such as branch instructions.

A load-store unit (LSU) 130 controls the reading from and writing to the scalar registers 90 and the vector registers 70.

The vector processor 60 provides an example of processing circuitry to selectively apply vector processing operations to one or more data items of one or more data vectors each comprising a plurality of data items at respective vector positions in the data vector, according to the state of respective predicate indicators associated with the vector positions. The decoder 50 and the vector processor 60 also provide an example of instruction decoder circuitry to decode program instructions; and instruction processing circuitry to execute instructions decoded by the instruction decoder circuitry.

Figure 2:
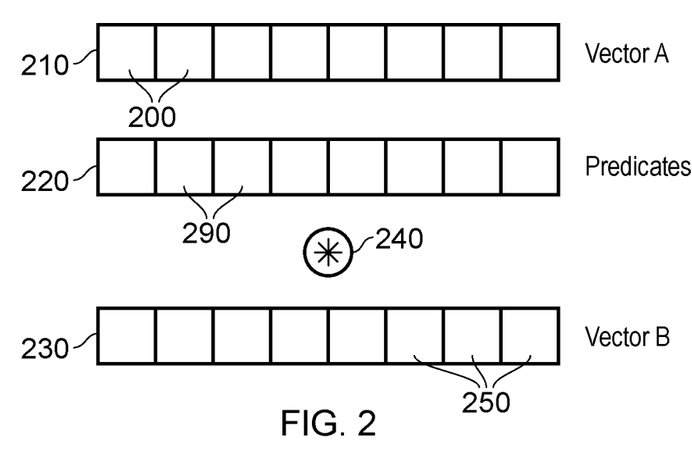
FIG. 2 schematically illustrates the use of predicate indicators.

FIG. 2 schematically illustrates the use of predicate indicators to control vector processing operations.

There can be instances where a single vector processing operation should be applied differently to different data items within a data vector. As mentioned above, the vector processing circuitry 60 provides for this by the use of so-called predicate indicators. Predicate indicators comprise information provided for each data item position within a data vector to indicate whether a processing operation should be carried out in respect of that data item position. In examples, the vector processing circuitry 60 can access multiple sets of predicate indicators, such that any particular vector processing operation can refer to one or more sets of predicate indicators as parameters to that vector processing operation.

Referring to FIG. 2, an example arrangement uses data vectors comprising eight data items 200 (Vector length $V_L=8$) but it will be appreciated that these arrangements can apply to different vector lengths. An example input data vector 210 (Vector A) is to be the subject of a vector processing operation 240 such that, in the absence of any control by predicate indicators, the vector processing operation 240 would be applied to each data item position. However, a set of predicate indicators 220, one for each data item position or "lane", is also provided to control the vector processing operation.

The data items 200 of the input vector (Vector A) are processed according to the vector processing operation 240 to generate data items 250 of an output data vector 230 (Vector B). If the predicate indicator 290 corresponding to a data item position in the output data vector 280 is set to "proceed" (for example, a value of 1) then the vector processing operation 240 in respect of that output vector position is carried out. If the corresponding predicate indicator for an output vector position is set to "do not proceed" (for example, a value of 0) then the vector processing operation 240 in respect of that output vector position is not carried out.

As mentioned above, in the present examples the predicate indicators control whether a vector processing operation for a particular output position or "lane" in relation to the output data vector 230 is carried out. However, in other examples, predicate indicators could be used to control whether data item positions in the input vector (or one or more input vectors) 210 are used.

This therefore provides an example of the predicate indicators having a state indicating that the vector processing instruction should be applied to those positions of a data vector corresponding to predicate indicators in that state, and another state indicating that the vector processing operation should not be so applied.

If a vector processing operation is not carried out in respect of a particular output vector position 250, because of the state of a predicate indicator, then in some examples a fixed value such as 0 can be inserted into that output position. In other examples the previous contents, whatever they are, of that output position can be left unchanged.

FIG. 2 therefore provides an example in which the processing circuitry is configured to apply a vector processing operation to generate an output data vector; and the predicate indicators are associated with respective vector positions in the output data vector so that vector processing operations are applied to generate data items in the output data vector at vector positions indicated by predicate indicators in the given state.

Figure 3:
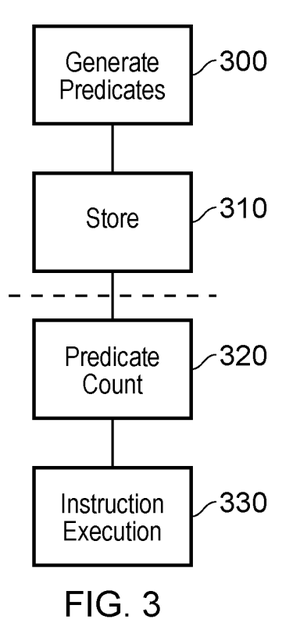
FIGS. 3 and 4 are schematic flowcharts relating to the use of a count of a number of predicate indicators in a given state.
Figure 4:
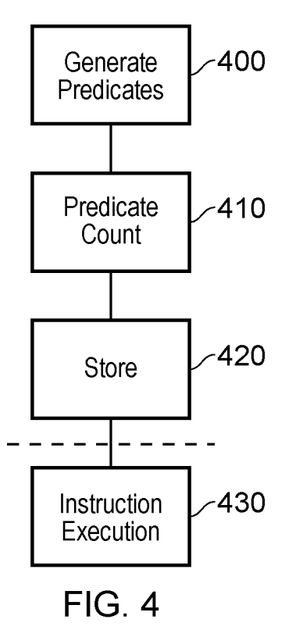

FIGS. 3 and 4 are schematic flow charts relating to the use of a count of a number of predicate indicators in a given state.

As technical background, in some data processing systems a count of the number of predicate indicators in a set of predicate indicators which are set to the "proceed" state (as an example of a "given state"), or in other words indicating that the corresponding vector position should be implemented as part of a vector calculation, is relevant to the execution of some instructions. This could be in the form of an operand or input data value provided to those instructions, or it could be that the instruction, as part of its execution, needs first to calculate the count of predicate indicators in the given state.

FIG. 3 is a schematic flow chart illustrating a previously proposed arrangement for obtaining a count of the predicate indicators in the given state. In the previously proposed arrangement of FIG. 3, at a step 300 a step of predicate indicators is generated. The generation of predicate indicators will be discussed further below, but as mentioned above they may be generated by the vector processor 60 and/or by the P-ALU 110. At a step 310 the set of predicate indicators is stored in the predicate store 100. A broken line indicates that the step 310 signifies the end of the predicate generation stage, with steps 320, 330 being associated with an instruction execution stage taking place later. At the instruction execution stage, a count is performed at a step 320 of the number of predicate indicators in a set of predicate indicators relevant to the instruction execution, and the remainder of the instruction execution takes place using that count value at a step 330. Note that the step 320, 330 could be performed separately (albeit at instruction execution) or could form part of a composite instruction execution stage.

The present disclosure has noted that some or all of the instructions which require a count value indicating the number of predicate indicators in a set of predicate indicators having the given state can be performance-critical in at least some applications. However, the instructions to generate or modify a set of predicate indicators (at the step 300, 310) are generally not performance critical. The present disclosure therefore notes that by performing the count of predicate indicators at the step 320, associated with the execution of a potentially performance-critical instruction, this can lead to delays in the execution of the performance-critical instruction.

FIG. 4 is a schematic flow chart illustrating a technique according to example embodiments.

At a step 400, a set of predicate indicators is generated in a manner generally similar to that applying to the step 300 discussed above. However, at a step 410, a count value indicating the number of predicate indicators in the just-generated set of predicate indicators is also generated. At a step 420, both the set of predicate indicators generated at the step 400 and the count value generated at the step 410 are stored. A horizontal broken line indicates that a step 430 can take place later at an instruction execution stage, at which time an instruction is executed making use of the previously-generated and stored count value.

Therefore, in these examples, the count value can be pre-derived at the step 410 before it is actually needed for instruction execution, as part of a non-performance-critical predicate generation process, allowing the potentially performance-critical instruction execution to take place at the step 430 without the need to spend processing time or effort calculating the count of predicate indicators in the given state.

Figure 5:
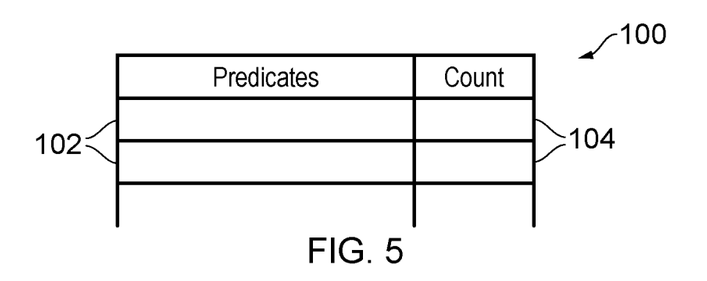
FIGS. 5 and 6 schematically illustrates example predicate stores.
Figure 6:
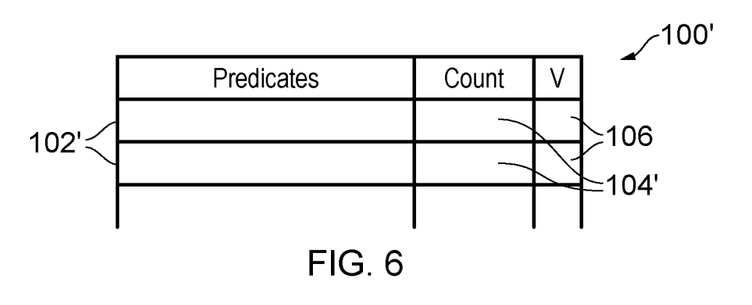

FIGS. 5 and 6 schematically illustrate example predicate stores forming at least part of the functionality of the predicate store 100.

Here it is noted that potential performance improvements can be obtained by storing a count value generated at the step 410 in close physical and/or logical proximity to the storage of the predicate indicators in the predicate store 100. One reason why this can provide a useful performance improvement is that generally speaking the predicate indicators and their associated count value would need to be accessed at a similar (or the same) time when an instruction is executed at the step 430, and many data processing systems operate more efficiently to access data items stored physically and/or logically adjacent to one another than to access data items having disparate storage locations. However, the present examples are not limited to adjacent logical and/or physical storage, and other arrangements could be considered in which different registers and/or memory areas are used to store the count value, with an association between the count value and the corresponding set of predicate indicators.

Returning to FIG. 5, the predicate store 100 comprises one or more sets 102 of predicate indicators and, for each such set, a corresponding count value 104 generated at the step 410.

FIG. 6 provides an alternative arrangement to be discussed further below, in which a predicate store 100' is configured to store sets 102' of predicate indicators, corresponding count values 104' and, for each count value an associated validity flag 106 (V).

Figure 7:
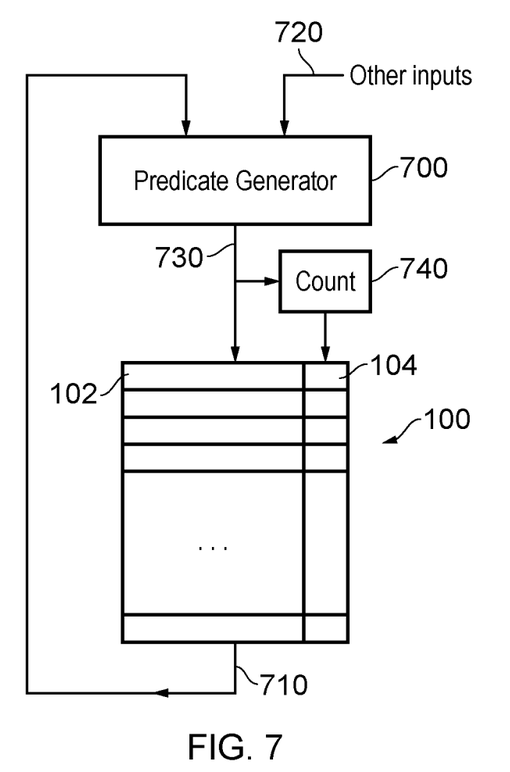
FIGS. 7 to 9 schematically illustrate the generation and storage of count values.
Figure 8:
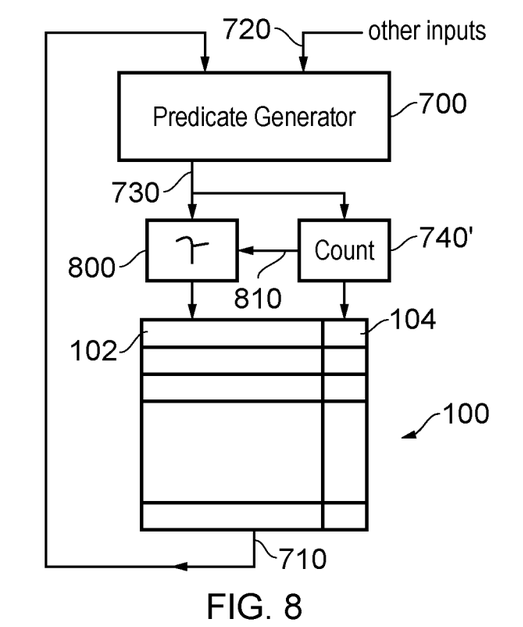
Figure 9:
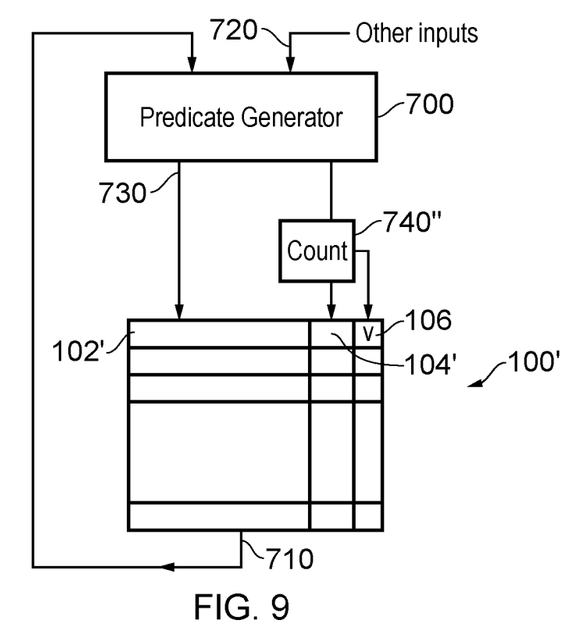

FIGS. 7 to 9 schematically illustrate the generation and storage of count values as part of a predicate generation process.

Referring to FIG. 7, a predicate generator 700 (for example the vector processor 60 as part of its functionality and/or the P-ALU 110 as part of its functionality) is arranged to generate one or more sets of predicate indicators for storage in the predicate store 100 based on one or both of: (a) one or more sets of predicate indicators 710 retrieved from the predicate store 100 and (b) one or more other inputs 720 which may be vector or scalar inputs or both. Based on these inputs, the predicate generator generates one or more sets 730 of predicate indicators to be stored at an appropriate location in the predicate store 100. A count generator 740 produces a count value indicative of the number of predicate indicators in the newly generated set(s) in the given state and this count value is stored in the count field 104 of the predicate store 100. Later, at instruction execution, both a set of predicate indicators and its associated count value may be read from the predicate store 100 by an instruction to be executed or as part of that instruction's execution.

The use of the predicate indicators 710 provides an example of the predicate generation circuitry generating the set of predicate indicators by applying the processing operation to one or more sets of predicate indicators retrieved from the predicate store. the writing of the newly generated predicate indicators 730 provides an example of the predicate generation circuitry storing a newly generated set of predicate indicators so as to overwrite one or more of the sets of predicate indicators retrieved from the predicate store.

Two example processor instructions in an example data processing apparatus, which operate to generate predicate indicators, will now be described.

(i) AND takes two predicate registers as inputs and a third predicate register as a mask and performs a bit-wise logical AND of the two input registers for every bit that has the corresponding mask bit set high. The result is stored as a predicate register.

(ii) CMPGT takes two vector registers from the vector register file and performs a comparison of corresponding vector elements. If the element in the first register is larger than the element in the second register, the corresponding bit in the predicate register is set high.

FIG. 8 schematically illustrates another example arrangement which is similar in many respects to that shown in FIG. 7, particularly in the way that the predicate generator operates. As before, the count generator 740 generates a count value to be stored in the field 104 of the predicate store 100. However, a difference in comparison to FIG. 7 is that a delay or latch 800 is provided. The delay or latch 800 receives the set of predicate indicators 730 generated by the predicate generator 700 and delays its storage in the predicate store 100 until an enable signal 810 is received from the count generator 740. The enable signal indicates that the count value has been prepared and is ready for storage.

This arrangement addresses a potential issue which is that the generation of the count value by the count generator 740' cannot in at least some examples start until after the set of predicate indicators 730 has been generated, but in any event it cannot complete until after the set of predicate indicators 730 has been completed generated. There is therefore the potential for a set of predicate indicators to be written to the predicate store 100 with either no count value stored in the predicate store 100 or a previous (now invalid) count value being stored there. The use of the enable signal 810 and the delay or latch 800 can be potentially useful in instances (such as those applying to very large vector lengths implying a large number of predicate indicators in an individual set) where the generation of the count value 740 may take a non-trivial length of time.

Note that although a separate element is shown schematically in FIG. 8, a separate delay or latch does not have to be provided; the functionality of delaying writing of the set of predicate indicators until the count value is ready could be implemented by the use of write enable signals at the predicate store 100 or, in example arrangements where the count value is generated by the predicate generator 700, by the predicate generator 700 not outputting the generated set of predicate indicators 730 until the count value is ready. In any of these arrangements, this provides an example of the predicate generation circuitry delaying storing a newly generated set of predicate indicators in the predicate store until the count value for the newly generated set of predicate indicators is ready to be stored.

FIG. 9 schematically illustrates another example arrangement which again is similar in many respects to FIG. 7 and the features in common will not be discussed again. FIG. 9 however uses a predicate store of the type discussed with reference to FIG. 6 above, in that as well as storing a set of predicate indicators 102' and a count value 104', the predicate store 100' also stores the validity flag V 106. The validity flag 106 is set by the count generator 740" when the count generator outputs (or has outputted) the count value 104' for storage in the predicate store 100'. So, the validity flag indicates that a valid count value is present in the predicate store 100'. This allows the generated set of predicate indicators 730 to be used (if required) straight away, even if the generation of the count value takes longer (for example, longer than one cycle). An instruction making use of the count value 104' checks the validity flag 106 to ensure that the count value it is using is validly associated with the corresponding set of predicate indicators 102'.

If or when the count generator 740" detects that the predicate store has been updated or a new set of predicates has been stored but the count generator has not generated and stored a count value in the same cycle or other period as the predicates are stored, the count generator can set the validity flag to a state (such as "low" or 0) indicating that the count value is currently invalid. The count generator can set the validity flag to a state (such as high or 1) indicating that the count value is now validly associated with the stored predicates. In some examples, the count generator 740" can act in each instance to set the validity flag to the invalid state as soon as it detects a new set of predicates from the predicate generator, and then set it to the valid state in response to the generation of a count.

FIG. 9 therefore provides an example of the predicate generation circuitry storing a count validity flag associated with each set of predicate indicators, in which the count validity flag for a given set of predicate indicators indicates whether the count value for the given set of predicate indicators is valid.

In each of the examples discussed with reference to FIGS. 7 to 9, the predicate generator 700 and the count generator 740 (740', 740") can collectively be considered as predicate generation circuitry to apply a processing operation to generate a set of predicate indicators, each associated with a respective one of the vector positions, to generate a count value indicative of the number of predicate indicators in the set having a given state, and to store the generated set of predicate indicators and the count value in the predicate store.

Figure 10:
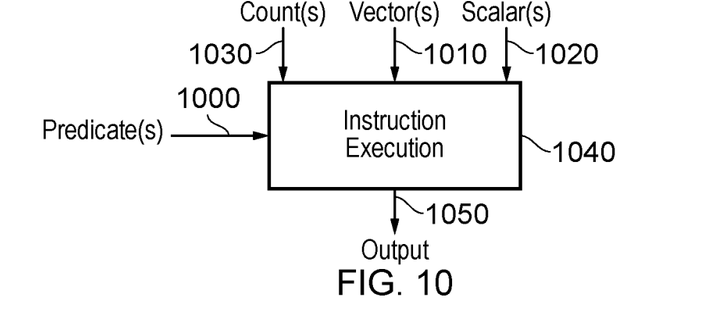
FIG. 10 schematically illustrates the execution of an instruction.

FIG. 10 schematically illustrates the execution of an instruction, for example corresponding to the step 430 of FIG. 4.

The instruction receives as inputs or operands one or more of: (i) one or more sets of predicate indicators 1000; (ii) one or more vector values 1010; (iii) one or more scalar values 1020; and (iv) one or more count values 1030 associated with the respective sets of predicate indicators 1000. The instruction execution 1040 is carried out with respect to these inputs to generate an output (vector, scalar, set of predicate indicators or one or more of these) 1050.

Note that the count values 1030 may not be formal or explicit inputs or operands to the instruction execution 1040 but may be required to be generated as part of the instruction execution. By arranging that the instruction uses the stored count value instead of generating the count value directly from the set of predicate indicators, the instruction execution 1040 can potentially be speeded up.

Depending on which type of predicate store is in use (as discussed with reference to FIGS. 5 to 9) the instruction execution 1040 may take into account the validity flag associated with the stored count values 1030.

FIG. 10 therefore illustrates an example in which one or more of the program instructions have the predicate indicators as an operand, execution of the one or more instructions being dependent upon the count value.

Two example processor instructions whose execution depends upon the count value will now be described briefly.

(i) INCP counts the number of ones in a predicate register and adds the count value to every element in a vector. If the count had not been made previously and stored adjacent to the predicate register file, this instruction would have to have been broken into two parts: the first of which does the count (for example being performed by the P-ALU 110) and the second of which does the addition.

(ii) A second instruction that uses the count is called SPLICE: this instruction copies the first active to last active elements (inclusive) from the first source vector to the lowest-numbered elements of the result. Then any remaining elements of the result are set to a copy of the lowest-numbered elements from a second source vector. (The count is needed to determine how many elements of the second source vector are to be copied.)

Figure 11:
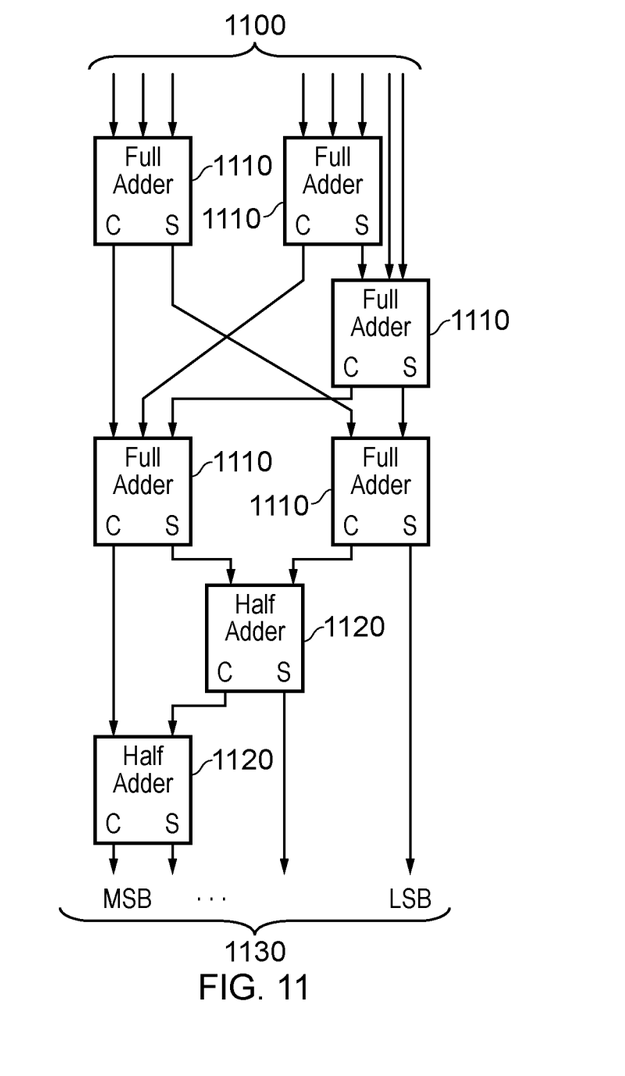
FIG. 11 schematically illustrates circuitry to generate a count value.

FIG. 11 schematically illustrates circuitry to generate a count value, for example forming at least part of the functionality of the count generator 740, 740' or 740".

In this example, a set of eight predicate indicators 1100 forms an input to the count process, and for the sake of this description it is assumed that the given state is represented by a logical 1. However, it will be appreciated that similar circuitry could be used in the case where (a) the plurality of the given state or its representation in a multi-bit representation system is different; and/or (b) the number of predicate indicators in a set is different to the 8. The example value of 8 has been used to allow a convenient representation in the diagram.

The set 1100 of predicate indicators is supplied to a set of full adders 1110 and half adders 1120 each having a sum (S) and carry (C) output. The staged combination of the predicate indicators 1100 and the sum and carry outputs of successive adders in the circuitry shown in FIG. 11 provides a set of output bits 1130. In this example, 4 output bits are provided in order to allow the representation of a count value between 0 and 8. These output bits 1130 are represented in FIG. 11 as a least significant bit (LSB) to the right-hand of FIG. 11 through to a most significant bit (MSB) to the left side of FIG. 11.

Figure 12:
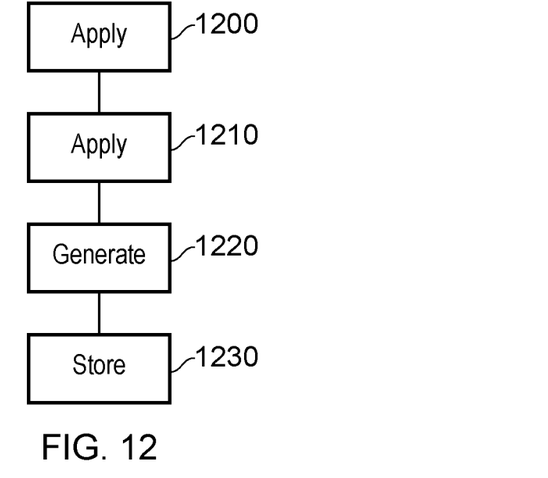
FIG. 12 is a schematic flowchart illustrating a method.

FIG. 12 is a schematic flowchart illustrating a data processing method comprising:

(at a step 1200) selectively applying vector processing operations to one or more data items of one or more data vectors each comprising a plurality of data items at respective vector positions in the data vector, according to the state of respective predicate indicators associated with the vector positions;

(at a step 1210) applying a processing operation to generate a set of predicate indicators, each associated with a respective one of the vector positions;

(at a step 1220) generating a count value indicative of the number of predicate indicators in the set having a given state, and (at a step 1230) storing the generated set of predicate indicators and the count value in a predicate store.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Data processing apparatus comprising:
processing circuitry to selectively apply vector processing operations to one or more data items of one or more data vectors each comprising a plurality of data items at respective vector positions in the data vector, according to the state of respective predicate indicators associated with the vector positions;
predicate generation circuitry comprising:
a predicate generator to generate a set of predicate indicators, each predicate indicator associated with a respective one of the vector positions, and
a count generator to generate a count value indicative of how many predicate indicators in a newly-generated set of predicate indicators have a state indicating that the processing circuitry should apply one of the vector processing operations to a data item at the associated vector position and to generate an enable signal to indicate that the count value has been generated, the count generator completing the generation of the count value after the completion of generation of the newly generated set of predicate indicators, and
a predicate store to store the newly-generated set of predicate indicators and the count value in the predicate store;
wherein the predicate generation circuitry is configured to delay storing the newly-generated set of predicate indicators in the predicate store until the enable signal indicates that the count value for the newly-generated set of predicate indicators is ready to be stored.

2. Apparatus according to claim 1, in which the predicate generation circuitry is configured to generate the set of predicate indicators by applying the processing operation to one or more sets of predicate indicators retrieved from the predicate store.

3. Apparatus according to claim 2, in which the predicate generation circuitry is configured to store the newly-generated set of predicate indicators so as to overwrite one or more of the sets of predicate indicators retrieved from the predicate store.

4. Apparatus according to claim 1, in which the predicate generation circuitry is configured to store a count validity flag associated with each set of predicate indicators, in which the count validity flag for a given set of predicate indicators indicates whether the count value for the given set of predicate indicators is valid.

5. Apparatus according to claim 1, in which:
the processing circuitry is configured to apply a vector processing operation to generate an output data vector; and
the predicate indicators are associated with respective vector positions in the output data vector so that vector processing operations are applied to generate data items in the output data vector at vector positions indicated by predicate indicators in the state indicating that calculation should proceed for the associated vector position.

6. Apparatus according to claim 1, in which the processing circuitry comprises:
instruction decoder circuitry to decode program instructions; and
instruction processing circuitry to execute instructions decoded by the instruction decoder circuitry.

7. Apparatus according to claim 6, in which one or more of the program instructions have the predicate indicators as an operand, execution of the one or more instructions being dependent upon the count value.

8. A data processing method comprising:
selectively applying vector processing operations to one or more data items of one or more data vectors each comprising a plurality of data items at respective vector positions in the data vector, according to the state of respective predicate indicators associated with the vector positions;
generating a set of predicate indicators, each predicate indicator associated with a respective one of the vector positions;
generating a count value indicative of how many predicate indicators in a newly-generated set of predicate indicators have a state indicating that the processing circuitry should apply one of the vector processing operations to a data item at the associated vector position, the step of generating the count value after the step of generating the set of predicate indicators has completed the generation of the newly generated set of predicate indicators,
generating an enable signal to indicate that the count value has been generated, and
storing the newly-generated set of predicate indicators and the count value in a predicate store;
wherein the generating and storing steps comprise delaying storing the newly-generated set of predicate indicators in the predicate store until the enable signal indicates that the count value for the newly-generated set of predicate indicators is ready to be stored.

9. Data processing apparatus comprising:
means for selectively applying vector processing operations to one or more data items of one or more data vectors each comprising a plurality of data items at respective vector positions in the data vector, according to the state of respective predicate indicators associated with the vector positions;
means for storing predicate indicators;
means for generating a set of predicate indicators, each predicate indicator associated with a respective one of the vector positions;
means for generating a count value indicative of how many predicate indicators in a newly-generated set of predicate indicators have a state indicating that the processing circuitry should apply one of the vector processing operations to a data item at the associated vector position and for generating an enable signal to indicate that the count value has been generated, the means for generating the count value being operable to complete the generation of the count value after the completion of generation of the newly generated set of predicate indicators; and
means for storing the newly-generated set of predicate indicators and the count value in the predicate store;
wherein the means for generating and the means for storing are operable to delay storing the newly-generated set of predicate indicators in the predicate store until the enable signal indicates that the count value for the newly-generated set of predicate indicators is ready to be stored.

* * * * *